US 6,652,020 B2

(12) United States Patent
Few

(10) Patent No.: US 6,652,020 B2
(45) Date of Patent: Nov. 25, 2003

(54) REINFORCING BRACKET FOR TRAILER-FRAME BUTT JOINTS

(75) Inventor: Jeffrey P. Few, Elkhart, IN (US)

(73) Assignee: Norco Industries, Inc., Elkhart, IN (US)

(*) Notice: Subject to any disclaimer, the term of this patent is extended or adjusted under 35 U.S.C. 154(b) by 0 days.

(21) Appl. No.: 10/119,258

(22) Filed: Apr. 9, 2002

(65) Prior Publication Data

US 2003/0189359 A1 Oct. 9, 2003

(51) Int. Cl.[7] .............................................. B26D 27/00
(52) U.S. Cl. ..................... 296/204; 296/29; 280/287.85; 280/789
(58) Field of Search ........................... 296/204, 203.01, 296/181, 182, 29, 26.13, 901, 171; 280/789, 414.1, 656, 287.85; 29/879.35; 248/480; 403/387, 232.1

(56) References Cited

U.S. PATENT DOCUMENTS

| 3,540,756 | A | | 11/1970 | Stout et al. | |
|---|---|---|---|---|---|
| 3,891,231 | A | | 6/1975 | Snoberger et al. | |
| 4,098,520 | A | * | 7/1978 | Ezaki et al. | 296/204 |
| 4,453,735 | A | * | 6/1984 | Penverne et al. | 280/43.18 |
| 4,753,450 | A | | 6/1988 | Wibben | |
| 4,848,835 | A | * | 7/1989 | DeRees | 296/204 |
| 4,966,386 | A | | 10/1990 | Werdich | |
| 5,028,072 | A | * | 7/1991 | Lindsay | 296/204 |
| 5,378,006 | A | * | 1/1995 | Stuart et al. | 280/149.2 |
| 5,549,352 | A | * | 8/1996 | Janotik et al. | 296/29 |
| 5,634,663 | A | * | 6/1997 | Krupp et al. | 296/29 |
| 5,718,048 | A | * | 2/1998 | Horton et al. | 296/204 |
| 5,816,616 | A | * | 10/1998 | Boyd | 280/847 |
| 5,836,606 | A | | 11/1998 | Spoto et al. | |
| 5,855,394 | A | * | 1/1999 | Horton et al. | 296/204 |
| 6,010,155 | A | * | 1/2000 | Rinehart | 296/29 |
| 6,179,369 | B1 | * | 1/2001 | Bender et al. | 296/29 |
| 6,189,930 | B1 | * | 2/2001 | Kalazny | 296/204 |
| 6,213,507 | B1 | * | 4/2001 | Ramsey et al. | 280/788 |
| 6,299,210 | B1 | * | 10/2001 | Ruehl et al. | 280/785 |
| 6,398,261 | B1 | * | 6/2002 | Ammer et al. | 296/204 |
| 6,485,054 | B1 | * | 11/2002 | Yurgevich | 280/789 |
| 2002/0063422 | A1 | * | 5/2002 | Few et al. | 280/789 |
| 2003/0030303 | A1 | * | 2/2003 | Panoz | 296/204 |

FOREIGN PATENT DOCUMENTS

| GB | 323537 | 1/1930 |
|---|---|---|
| GB | 1552443 | 9/1979 |
| GB | 1562883 | 3/1980 |
| GB | 2044193 A | 10/1980 |

* cited by examiner

Primary Examiner—Kiran Patel
(74) Attorney, Agent, or Firm—Hahn Loesner + Parks, LLP; W. Edward Crooks

(57) ABSTRACT

A reinforcing bracket for trailer frame-member butt joints comprises a first flange adapted to be parallel to the face of the frame members, a second flange extending perpendicularly from the first flange, and a third flange extending from the second flange parallel to the first flange. The first flange includes a plurality of dimples that correspond to dimples in the frame members. Each dimple in the first flange has an aperture therein that corresponds to an aperture in the corresponding frame-member dimple. In operation, the bracket is bolted to the frame members forming the joint. The present invention also describes a trailer frame utilizing the reinforcing bracket.

13 Claims, 5 Drawing Sheets

REINFORCING BRACKET FOR TRAILER-FRAME BUTT JOINTS

TECHNICAL FIELD

The present invention relates to reinforcing brackets for trailer frames. More specifically, the present invention relates to reinforcing brackets for trailer frames that reinforce linear, butt-type joints between two frame members.

BACKGROUND OF THE INVENTION

Trailer frames, such as boat trailers, horse trailers, utility trailers, and the like are typically manufactured by welding frame members together. Typical frame members include flat, L-shaped or U-shaped metal rail sections or tube sections. Although welded trailer frames provide strength to frame member joints, they also trigger a number of problems with, inter alia, shipping and storage.

One problem with welded trailer frames is that they are shipped to wholesalers and/or retailers as a completed frame. Because the entire frame is pre-assembled, only a few trailers can be shipped at a time. A second problem with welded trailers is inventory. Entities that sell trailers and entities that use trailers in manufacturing other equipment, such as recreational vehicles, must stock trailer frames pre-assembled. Such inventoried trailers take up significant storage space, which limits the number and diversity of trailers available in stock.

One solution to the problems associated with welded trailer frames is a trailer frame that bolts together instead of being welded together. An example of a bolt-together trailer frame is disclosed in application Ser. No. 10/045,365, incorporated herein by reference. In such a bolted trailer frame, individual components of trailers can be shipped in greater quantities and stored in greater quantities, because each trailer could be assembled as needed. However, one problem of bolted trailer frames is the strength of the joints between frame members, such as butt joints between two longitudinal frame members. When two longitudinal members are joined end-to-end, as in a butt joint, there is a need for a reinforcing bracket that strengthens the joint and enables it to resist vertical, horizontal, and twisting forces. This is particularly necessary when the frame members being joined support the trailer axle. Accordingly, the present invention is hereby presented.

BRIEF SUMMARY OF THE INVENTION

A reinforcing bracket for trailer frame-member butt joints comprises a first flange parallel to a face of the frame member, a second flange extending perpendicularly from the first flange, and a third flange extending from the second flange parallel to the first flange. The attached flange strengthens the joint between frame members and therefore allows the joint to resist both horizontal, vertical, and twisting forces.

The first flange has a plurality of dimples that nest into corresponding dimples in the face of both frame members. Each dimple has an aperture located therein that corresponds to an aperture in the frame members. The apertures receive bolts or other fastening devices. In operation, the user inserts bolts through the apertures in the frame members and through the corresponding apertures in the bracket. The user then secures the bracket with nuts or other fastening devices, thereby fastening the reinforcing bracket to both frame members of the butt joint. The present invention also discloses a trailer frame utilizing the reinforcing bracket.

DETAILED DESCRIPTION OF THE INVENTION

The present invention will now be described in greater detail with reference to the appended drawings.

Figure 1:
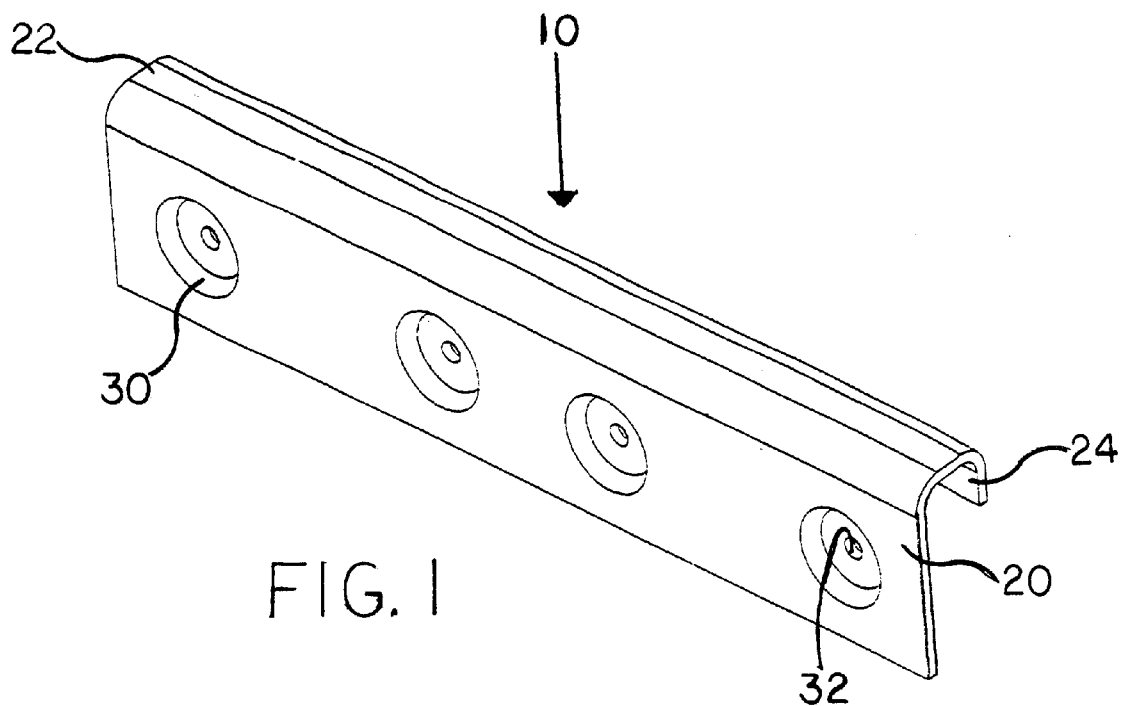
FIG. 1 is a perspective view of a reinforcing bracket for trailer-frame butt joints, in accordance with a preferred embodiment of the present invention.

A preferred embodiment of a reinforcing bracket for trailer-frame butt joints ("joints"), generally identified by reference number 10, is illustrated in FIG. 1. Preferably, the bracket 10 includes two vertically extending, laterally spaced flanges with the vertically extending flanges being connected by a horizontally extending flange. The reinforcing bracket 10 thus comprises a first flange 20, a second flange 22 extending perpendicularly from the first flange 20, and a third flange 24 extending from the second flange 22 wherein the third flange 24 is parallel to the first flange 20.

Figure 2:
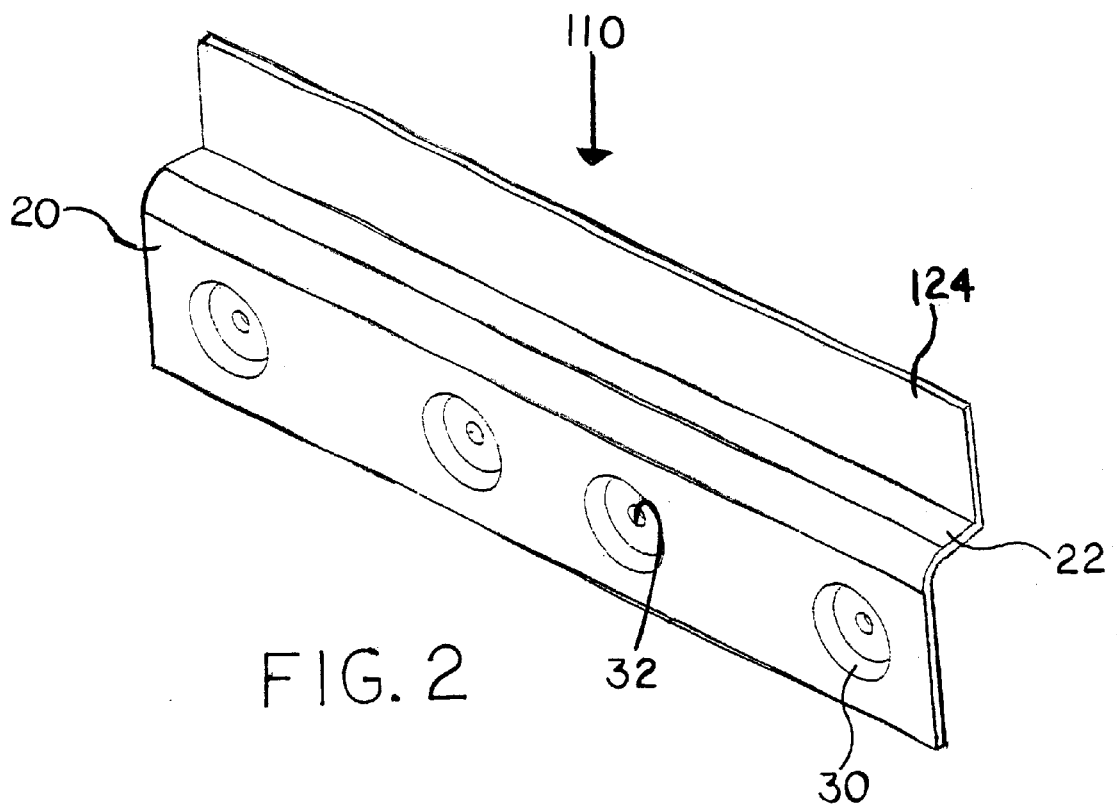
FIG. 2 is a perspective view of a reinforcing bracket for trailer-frame butt joints, in accordance with a second preferred embodiment of the present invention.
Figure 3:
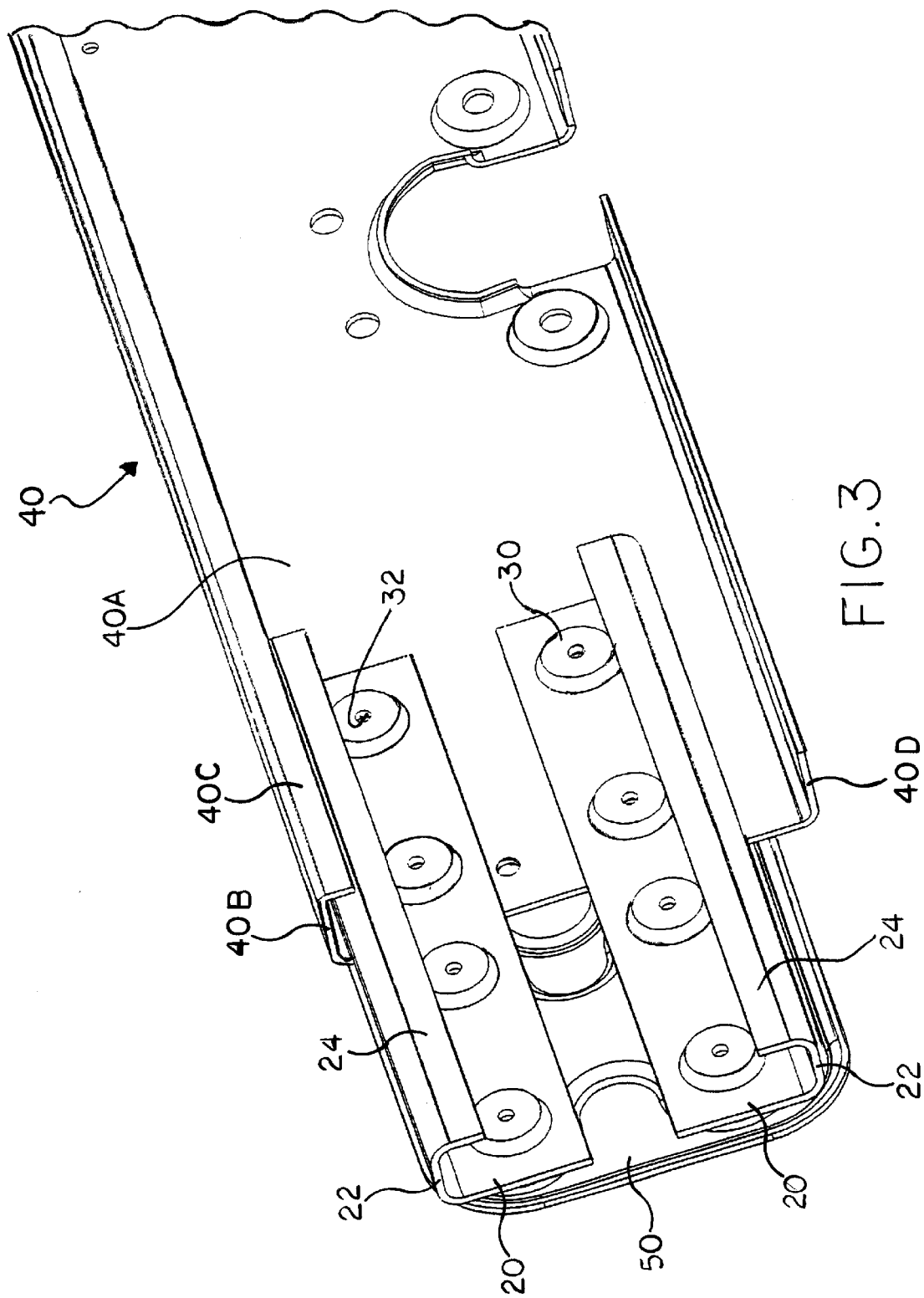
FIG. 3 is a interior perspective view of two reinforcing brackets attached to one trailer frame member and a reinforcing plate, in accordance with a preferred embodiment of the present invention.
Figure 4:
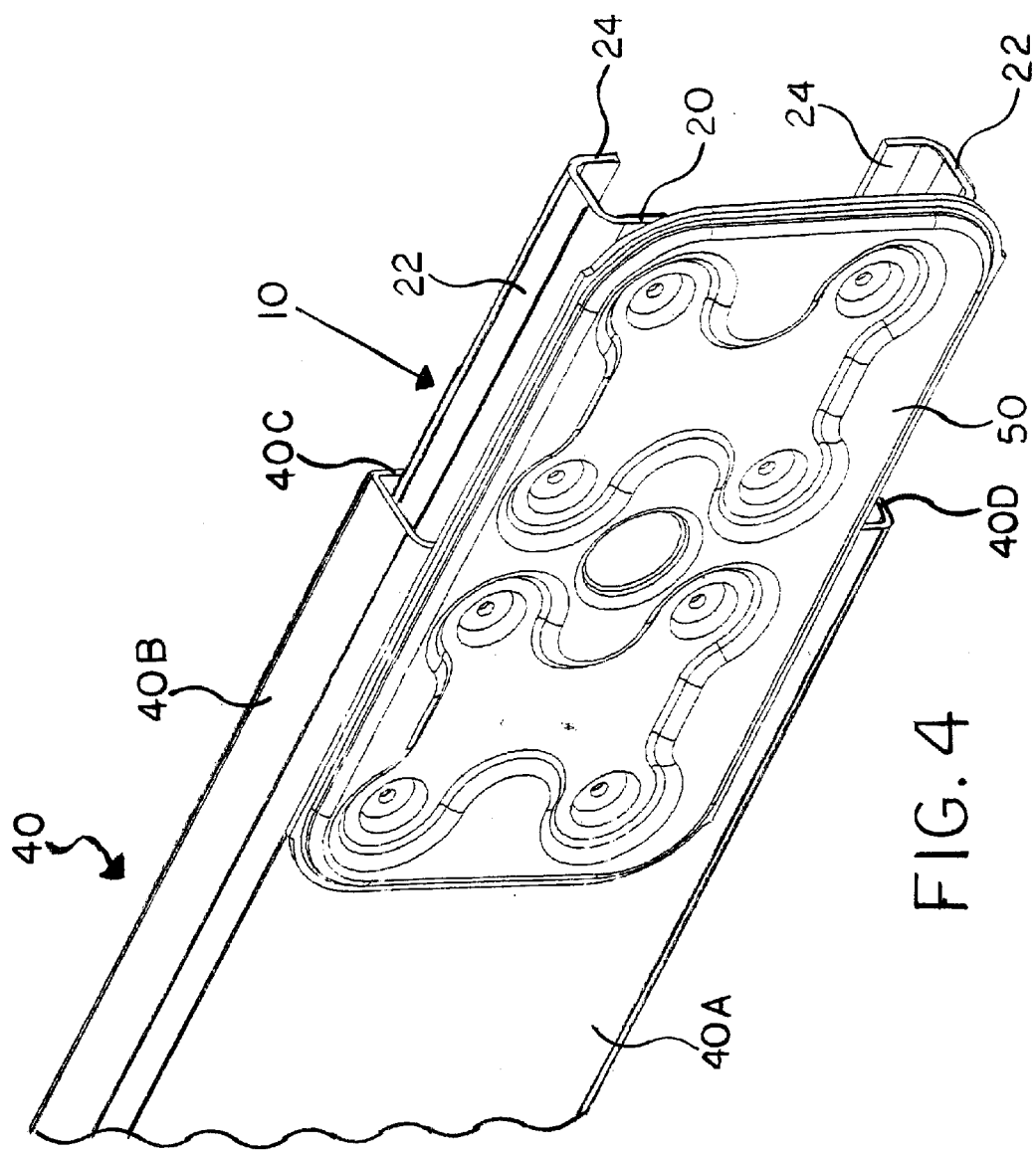
FIG. 4 is an exterior perspective view of the two reinforcing brackets shown in FIG. 3.
Figure 6:
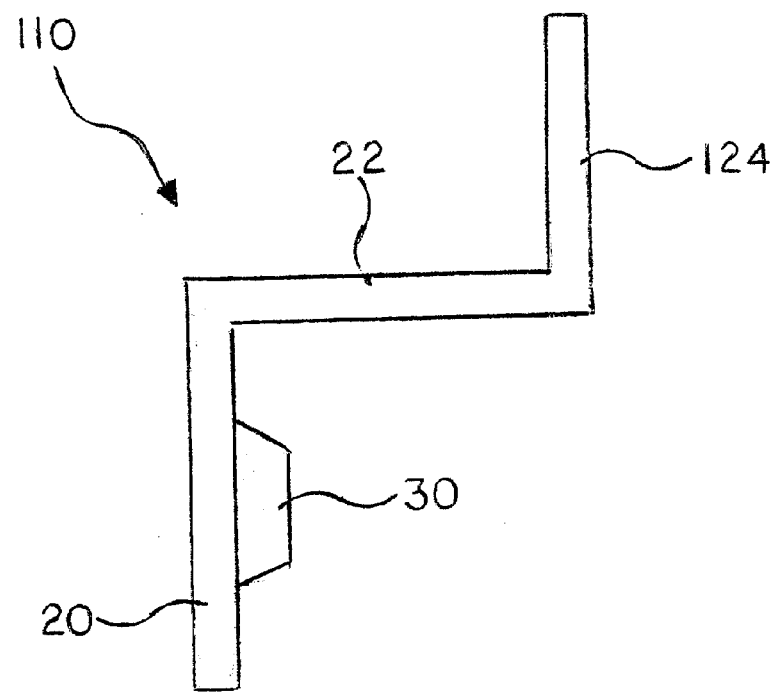
FIG. 6 is a right side view of the reinforcing bracket shown in FIG. 2.
Figure 7:
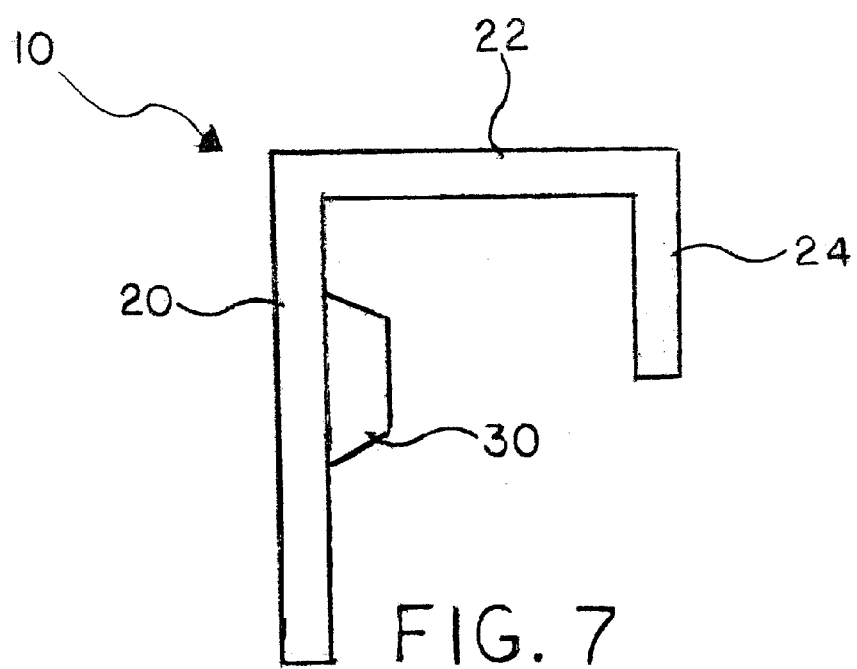
FIG. 7 is a right side view of the reinforcing bracket shown in FIG. 1.

As seen in FIGS. 1 and 7, the bracket may generally have a "J" shape when viewed from the side, wherein the third flange 24 extends downwardly from the second flange 22. Alternatively, as seen in FIGS. 2 and 6, the third flange 124 can extend upwardly from the second flange 22. Preferably, two (2) brackets 10 are used at a joint, as illustrated in FIGS. 3–4. However, any number of brackets 10 could be attached to the frame members 40 without deviating from the scope of the present invention.

As seen in FIG. 3, the bracket is adapted to attach to frame members 40. Each frame member 40 comprises a vertically extending face 40A, an upper horizontally-extending flange 40B with a return flange 40C, and a lower horizontally-extending flange 40D. The first flange 20 of the bracket is generally parallel to the faces 40A of the frame members 40 that form the joint, and adapted to bolt to the faces 40A of both frame members 40. Once attached, the bracket 10 preferably has a complimentary shape to, and fits within the area of the frame member 40 defined by the face 40A, the horizontally extending flange 40B or 40D, and the return flange 40C, if applicable. Additionally, the first flange 20 includes a plurality of dimples 30. In a preferred embodiment, the bracket 10 has four (4) dimples, i.e. two (2) for each frame member 40 of the joint. However, a bracket 10 with any number of dimples is contemplated, and can be utilized without deviating from the scope of the present invention.

Each dimple 30 corresponds to a dimple (not shown) in the frame members 40 of the joint. When the bracket 10 is attached to the frame members 40, the dimples 30 in the first flange 20 of the bracket 10 "nest" into the corresponding dimples in the face 40A of the frame members 40. This "nesting" of the bracket 10 and frame members 40 provides additional strength to the joint between the two frame members 40, by allowing loads to flow through the bracket 10 and into the frame members 40, instead of flowing primarily into the bracket.

In a preferred embodiment, the center of each dimple 30 has an aperture 32 that corresponds to an aperture (not shown) in the frame members 40 of the joint. When attaching the bracket 10 to the frame members 40, the user inserts bolts or other fastening devices (not shown) through the apertures in the frame members 40 and through the apertures 30 in the bracket 10. Subsequently, the user secures the bracket 10 to the frame members 40 via nuts or other known fastening devices. When the bracket is secured to the frame members, the dimples 30 in the bracket "nest" into the dimples in the frame members 40, providing strength to the joint.

The "nesting" of the plurality of dimples 30 in the first flange 20 of the bracket into dimples in the frame members 40 provides an increase in torque resistance of the bracket 10 in comparison with a bracket without dimples. In a bracket without dimples, forces or loads on the bracket would be resisted via the fastening devices such as bolts and nuts. In the present invention, the "nesting" dimples 30 allow loads to flow into the trailer frame 60. This increase in torque resistance prevents twisting of the bracket when loads are applied to the trailer frame 60.

The bracket 10 is preferably made of a rigid metal such as steel, although other metals and metal alloys can be utilized without deviating from the scope of the present invention. Additionally, the bracket 10 is preferably finish-painted or coated, such that the bracket 10 is ready for use in a trailer frame 60 when the bracket 10 is shipped to the user.

The size of the bracket 10 may vary, as well, without deviating from the scope of the present invention. For example, in trailer frames 60 with larger frame members, any or all flanges of the bracket 10 may be larger as well. As such, the size of the dimples 30 and apertures 32 in the first flange 20 may vary in accordance with the size of the frame members 40 and bolts.

Figure 5:
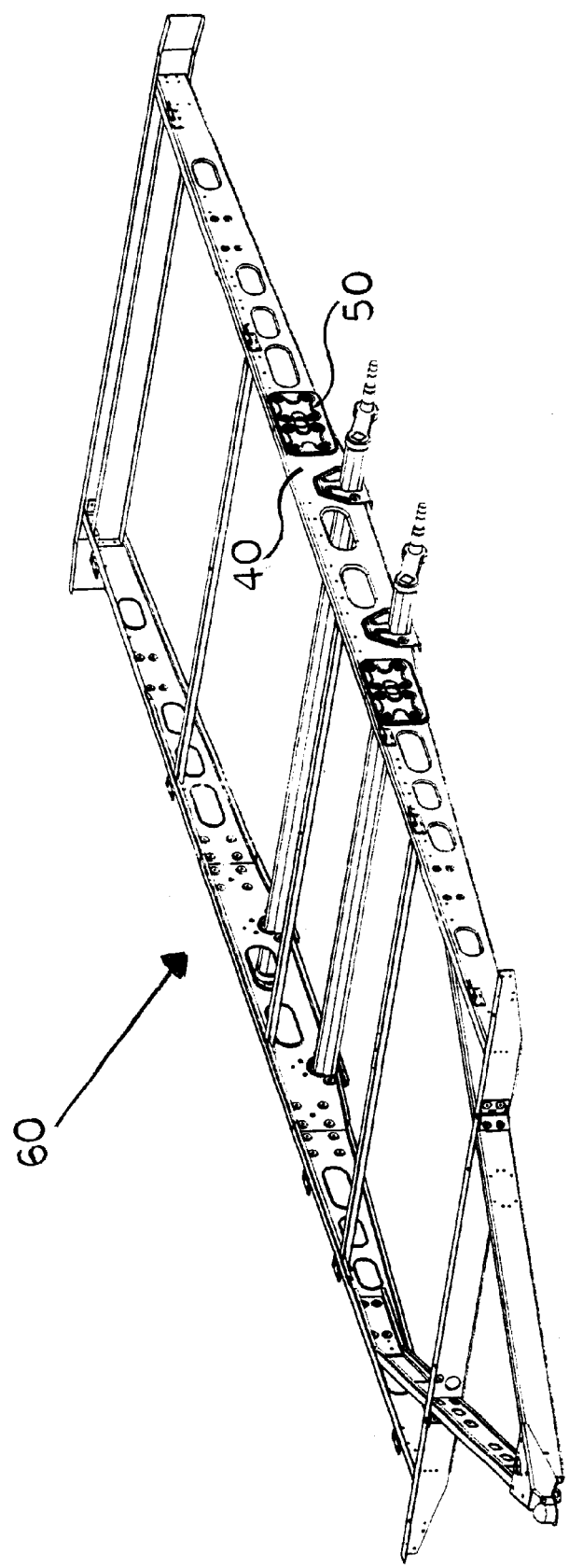
FIG. 5 is a perspective view of an exemplary bolt-together trailer frame, in accordance with a preferred embodiment of the present invention.

As seen in FIGS. 3–4, the bracket 10 may be utilized in conjunction with a reinforcement plate 50 on the opposite side of the joint. However, use of the bracket 10 without a reinforcement plate 50 or with other reinforcing structures is also contemplated. Additionally, the user may attach brackets 10 on both the interior and the exterior of the joint. It should be understood that brackets 10 used on the exterior of a joint may have larger first flanges 20 and second flanges 22 than brackets 10 used on the interior of joints. Once attached, the brackets 10 increase the strength of butt joints in trailer frames 60 and the like, such as the trailer frame 60 illustrated in FIG. 5.

The forgoing disclosure is illustrative of the present invention and is not to be construed as limiting thereof. Although one or more embodiments of the invention have been described, persons of ordinary skill in the art will readily appreciate that numerous modifications could be made without departing from the scope and spirit of the disclosed invention. As such, it should be understood that all such modifications are intended to be included within the scope of this invention. The written description and drawings illustrate the present invention and are not to be construed as limited to the specific embodiments disclosed.

What is claimed is:

1. A bolt-together trailer frame comprising:
   at least two longitudinal members on each side of the trailer frame,
   at least two cross-members each attached to longitudinal members by bolts, and
   at least one reinforcing bracket fastening longitudinal members on each side of the trailer frame to each other, the reinforcing bracket comprising:
   a first flange parallel to a face of the longitudinal member;
   a second flange extending from the first flange, wherein the second flange is approximately ninety degrees to the first flange; and
   a third flange extending from the second flange, wherein the third flange is parallel to the first flange.

2. The trailer frame as described in claim 1, wherein the first flange of the at least one reinforcing bracket and the at least two longitudinal members each have a plurality of dimples, each dimple having an aperture therein, and wherein the dimples of the at least two longitudinal members and the at least one reinforcing bracket are in a nesting engagement.

3. The trailer frame as described in claim 2, wherein the first flange of the at least one reinforcing bracket has four dimples.

4. In a bolt-together trailer frame having a plurality of frame members bolted together to form the trailer frame, the improvement comprising:
   at least two frame members, an end of a first one of the frame members abutting an end of a second one of the frame members;
   at least one reinforcing bracket positioned against the first and second frame members, the reinforcing bracket spanning the abutted ends of the first and second frame members, the reinforcing bracket comprising: two laterally spaced apart vertical flanges connected by a laterally extending flange; and
   a plurality of fasteners connecting the first and second frame members to the at least one reinforcing bracket to one another.

5. The bolt-together trailer frame according to claim 4, wherein the number of reinforcing brackets is two, one being positioned vertically above the other.

6. The bolt-together trailer frame according to claim 4, wherein the first and second frame members each have a longitudinally extending vertical face, an upper horizontally-extending flange, and a return flange extending away from the upper horizontally-extending flange, the at least one reinforcing bracket having a complementary shape, and the at least one reinforcing bracket being in nested engagement with the first and second frame members.

7. The bolt-together trailer frame according to claim 4, wherein the first and, second frame members and the at least one reinforcing bracket each have a plurality of dimples therein, the dimples of the first and second frame members and the dimples of the at least one reinforcing bracket being in nested engagement.

8. The bolt-together trailer frame according to claim 4, wherein the at least one reinforcing bracket laterally extending flange extends at a ninety-degree angle from the at least one reinforcement member vertical flanges.

9. The bolt-together trailer frame according to claim 8, wherein both vertical flanges extend from the laterally extending flange in the same direction.

10. The bolt-together trailer frame according to claim 4, wherein the at least one reinforcing bracket laterally extending flange extends at an angle that is not ninety degrees from the at least one reinforcement member vertical flanges.

11. The bolt-together trailer frame according to claim 4, further comprising:
   a reinforcement plate positioned against the first and second frame members, the first and second frame members being between the reinforcement plate and the reinforcing bracket, the reinforcement plate spanning the abutted ends of the first and second frame members, the plurality of fasteners connecting the first and second frame members, the reinforcement plate and the at least one reinforcing bracket to one another.

12. The bolt-together trailer frame according to claim 11, wherein the first and second frame members, the reinforcement plate and the at least one reinforcing bracket each have a plurality of dimples therein, the dimples of the first and second frame members, the dimples of the reinforcement plate and the at least one reinforcing bracket being in nested engagement.

13. In a bolt-together trailer frame having a plurality of frame members bolted together to form the trailer frame, the improvement comprising:

at least two frame members, an end of a first one of the frame members abutting an end of a second one of the frame members;

at least one reinforcing bracket positioned against the first and second frame members, the reinforcing bracket spanning the abutted ends of the first and second frame members, the reinforcing bracket comprising: two laterally spaced apart vertical flanges connected by a laterally extending flange; and a plurality of fasteners connecting the first and second frame members and the at least one reinforcement member to one another, the first and second frame members and the at least one reinforcing bracket each having a plurality of dimples therein, the dimples of the first and second frame members and the dimples of the at least one reinforcing bracket being in nested engagement.

* * * * *

UNITED STATES PATENT AND TRADEMARK OFFICE
CERTIFICATE OF CORRECTION

PATENT NO. : 6,652,020 B2
DATED : November 25, 2003
INVENTOR(S) : Jeffrey P. Few It is certified that error appears in the above-identified patent and that said Letters Patent is hereby corrected as shown below:

<u>Column 4,</u>
Line 11, change "member;" to -- members; --

Signed and Sealed this

Twenty-third Day of March, 2004

JON W. DUDAS
*Acting Director of the United States Patent and Trademark Office*